US011586209B2

(12) United States Patent
Luo et al.

(10) Patent No.: US 11,586,209 B2
(45) Date of Patent: Feb. 21, 2023

(54) DIFFERENTIAL DYNAMIC PROGRAMMING (DDP) BASED PLANNING ARCHITECTURE FOR AUTONOMOUS DRIVING VEHICLES

(71) Applicant: Baidu USA LLC, Sunnyvale, CA (US)

(72) Inventors: Qi Luo, Sunnyvale, CA (US); Jinyun Zhou, Sunnyvale, CA (US); Shu Jiang, Sunnyvale, CA (US); Jiaming Tao, Sunnyvale, CA (US); Yu Wang, Sunnyvale, CA (US); Jiaxuan Xu, Sunnyvale, CA (US); Kecheng Xu, Sunnyvale, CA (US); Jinghao Miao, Sunnyvale, CA (US); Jiangtao Hu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 304 days.

(21) Appl. No.: 16/843,545

(22) Filed: Apr. 8, 2020

(65) Prior Publication Data

US 2021/0318683 A1 Oct. 14, 2021

(51) Int. Cl.
| | |
|---|---|
| *B60W 30/00* | (2006.01) |
| *G01C 21/16* | (2006.01) |
| *G01C 21/34* | (2006.01) |
| *G01S 19/49* | (2010.01) |
| *G05D 1/00* | (2006.01) |
| *G05D 1/02* | (2020.01) |

(52) U.S. Cl.
CPC ....... *G05D 1/0212* (2013.01); *G01C 21/3407* (2013.01); *G05D 1/0083* (2013.01); *G05D 2201/0212* (2013.01); *G05D 2201/0213* (2013.01)

(58) Field of Classification Search
CPC ... B60W 30/00; G05D 1/0212; G05D 1/0083; G05D 2201/0212; G05D 2201/0213; G05D 1/0214; G01C 21/3407; G01C 21/3453; G01C 21/3415; G01C 21/165; G01S 19/49
USPC .......................................................... 701/25
See application file for complete search history.

(56) References Cited

U.S. PATENT DOCUMENTS

| | | | |
|---|---|---|---|
| 2018/0032082 A1* | 2/2018 | Shalev-Shwartz | ......................... G01C 21/3602 |
| 2018/0259966 A1* | 9/2018 | Long | ............... G06V 20/588 |
| 2019/0361449 A1* | 11/2019 | Ueno | .................... G08G 1/166 |
| 2020/0027354 A1* | 1/2020 | Goldman | ............... G07C 5/008 |
| 2021/0197819 A1* | 7/2021 | Okamoto | ............. B60W 40/04 |
| 2021/0201676 A1* | 7/2021 | Tariq | ..................... G08G 1/017 |

(Continued)

*Primary Examiner* — Abby Y Lin
*Assistant Examiner* — Hossam M Abd El Latif
(74) *Attorney, Agent, or Firm* — Womble Bond Dickinson (US) LLP

(57) ABSTRACT

In one embodiment, method performed by an autonomous driving vehicle (ADV) that determines, within a driving space, a plurality of routes from a current location of the ADV to a desired location. The method determines, for each route of the plurality of routes, an objective function to control the ADV autonomously along the route and, for each of the objective functions, performs Differential Dynamic Programming (DDP) optimization in view of a set of constraints to produce a path trajectory. The method determines whether at least one of the path trajectories satisfies each constraint and, in response to a path trajectory satisfying each of the constraints, selects the path trajectory for navigating the ADV from the current location to the desired location.

21 Claims, 10 Drawing Sheets

(56) References Cited

U.S. PATENT DOCUMENTS

2021/0285778 A1* 9/2021 Ito .......................... G06N 5/003

* cited by examiner

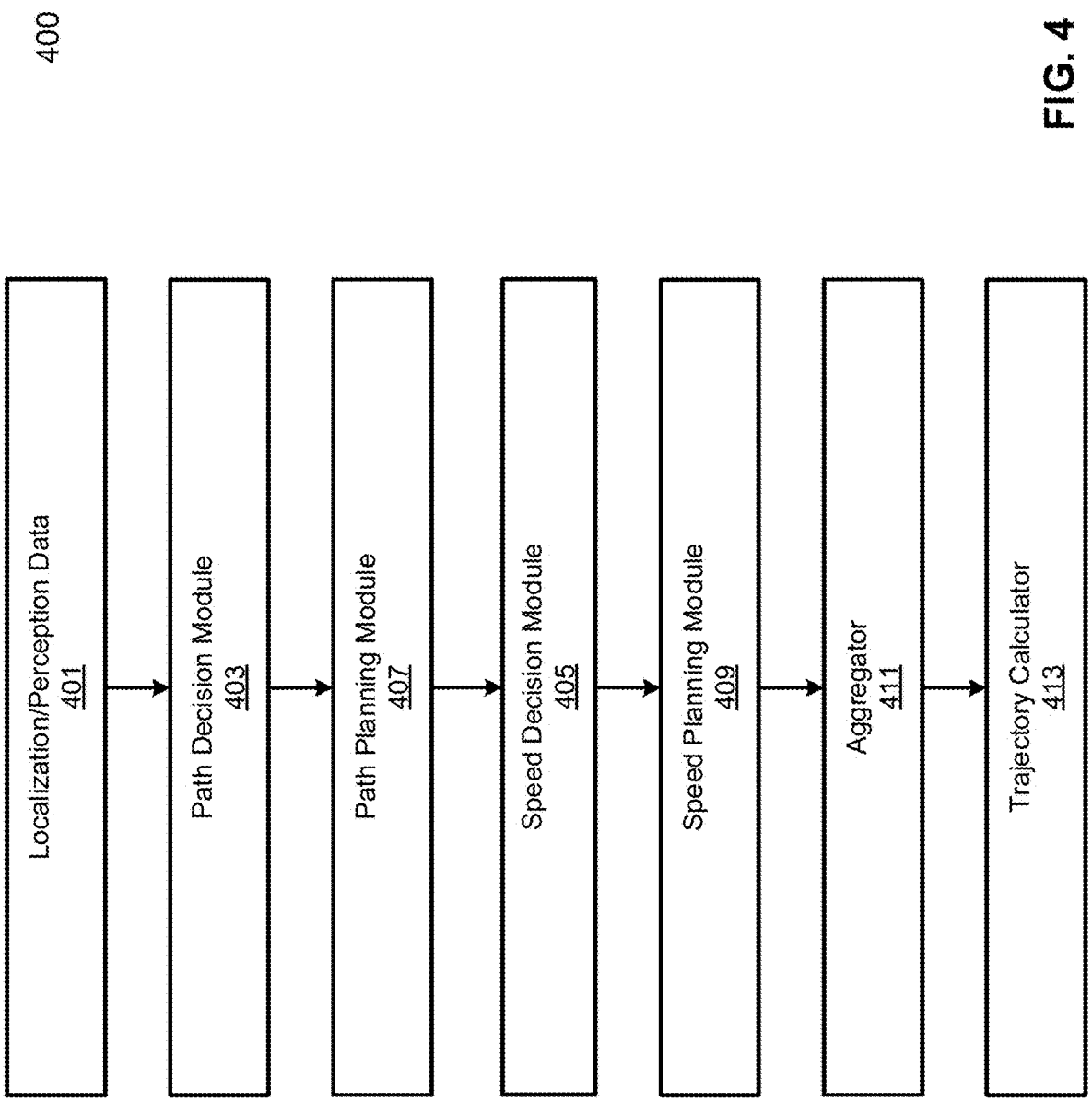

DIFFERENTIAL DYNAMIC PROGRAMMING (DDP) BASED PLANNING ARCHITECTURE FOR AUTONOMOUS DRIVING VEHICLES

TECHNICAL FIELD

Embodiments of the present disclosure relate generally to operating autonomous vehicles. More particularly, embodiments of the disclosure relate to a differential dynamic programming (DDP) based planning architecture.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In order to effectively perform these operations, autonomous vehicles relay on complex algorithms that are performed by onboard processors. Since some of these algorithms are being processed by the processors in real time (e.g., while the autonomous vehicle is traveling on a roadway), the process time which is required by the processors to perform the algorithms is critical.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment of this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

FIG. 4 is a block diagram illustrating an example of decision and planning processes according to one embodiment.

DETAILED DESCRIPTION

Figure 1:
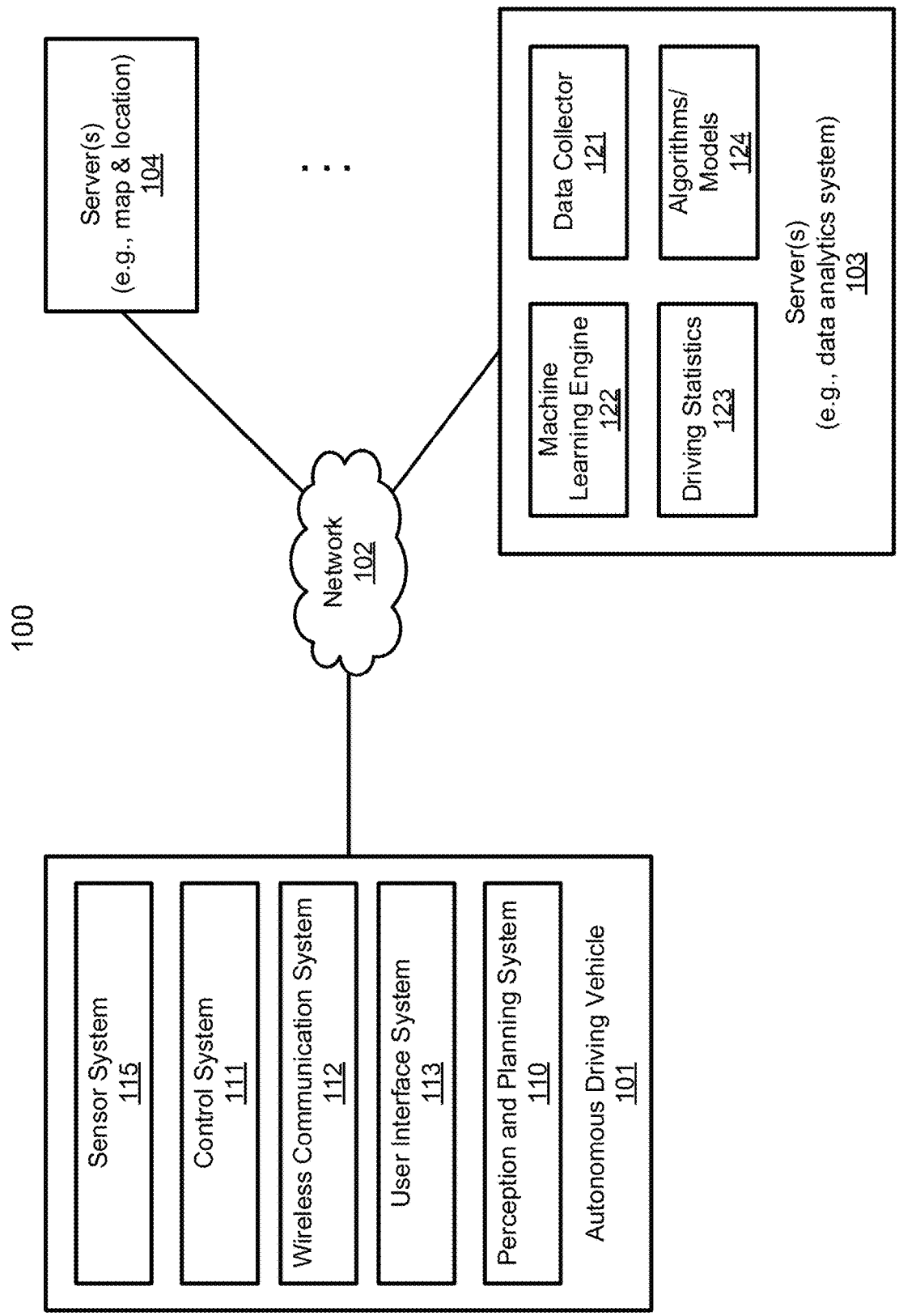
FIG. 1 is a block diagram illustrating a networked system according to one embodiment.

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The present disclosure solves the problem of efficiently generating an optimal path trajectory along which an autonomous driving vehicle (ADV) is to travel, thereby reducing a required process time by one or more onboard processors. The solution proposed in the current disclosure provides a constrained Differential Dynamic Programming (DDP) optimization architecture to optimize several candidate paths at the same time (e.g., in parallel), and to select the most optimal candidate path for which the ADV to navigate. This is in contrast to other optimization architectures (e.g., Sequential Quadratic Programming (SQP) or Quadratic Programming (QP)), in which a single candidate path is optimized at a time due to limited calculation time. As a result, the proposed solution enables an ADV to dynamically optimize multiple paths at once, thereby reducing the overall processing time.

According to some embodiments, a computer-implemented method performed by an ADV is disclosed. The method includes determining, within a driving space, several routes from a current location of the ADV to a desired location, determining, for each route, an objective function to control the ADV autonomously along the route, for each of the objective functions, performing DDP optimization in view of a set of constraints to produce a path trajectory, determining whether at least one of the path trajectories satisfies each constraint, and in response to a path trajectory satisfying each of the constraints, selecting the path trajectory for navigating the ADV from the current location to the desired location.

In one embodiment, the set of constraints comprises at least one of a velocity of the ADV, an acceleration of the ADV, a distance in front of the ADV, and speed limit within the driving space.

In another embodiment, the set of constraints is a first set of constraints, wherein the method further comprises, in response to none of the path trajectories satisfying each of the constraints, automatically relaxing one or more constraints of the first set of constraints to produce a second set of constraints, for each of the objective functions, performing DDP optimization in view of the second set of constraints to produce a new path trajectory, and determining whether at least one of the new path trajectories satisfies each constraint of the second set of constraints. In some embodiments, automatically relaxing the one or more constraints comprises at least one of increasing the one or more constraints by a predetermined threshold and removing one or more constraints such that the second set of constraints includes the first set of constraints less than the removed one or more constraints.

In one embodiment, the DDP optimization is performed upon each of the objective functions in parallel with one another. In another embodiment, the routes are two to five routes, where the DDP optimization is performed upon each of the objective functions associated with the two to five routes in parallel. In some embodiments, determining whether at least one of the path trajectories satisfies each constraint comprises identifying a feasible solution associated with at least one of the optimized objective functions in view of all of the constraints.

In another embodiment of the disclosure, a non-transitory machine-readable medium and a data processing system perform at least some of the processes as described herein.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
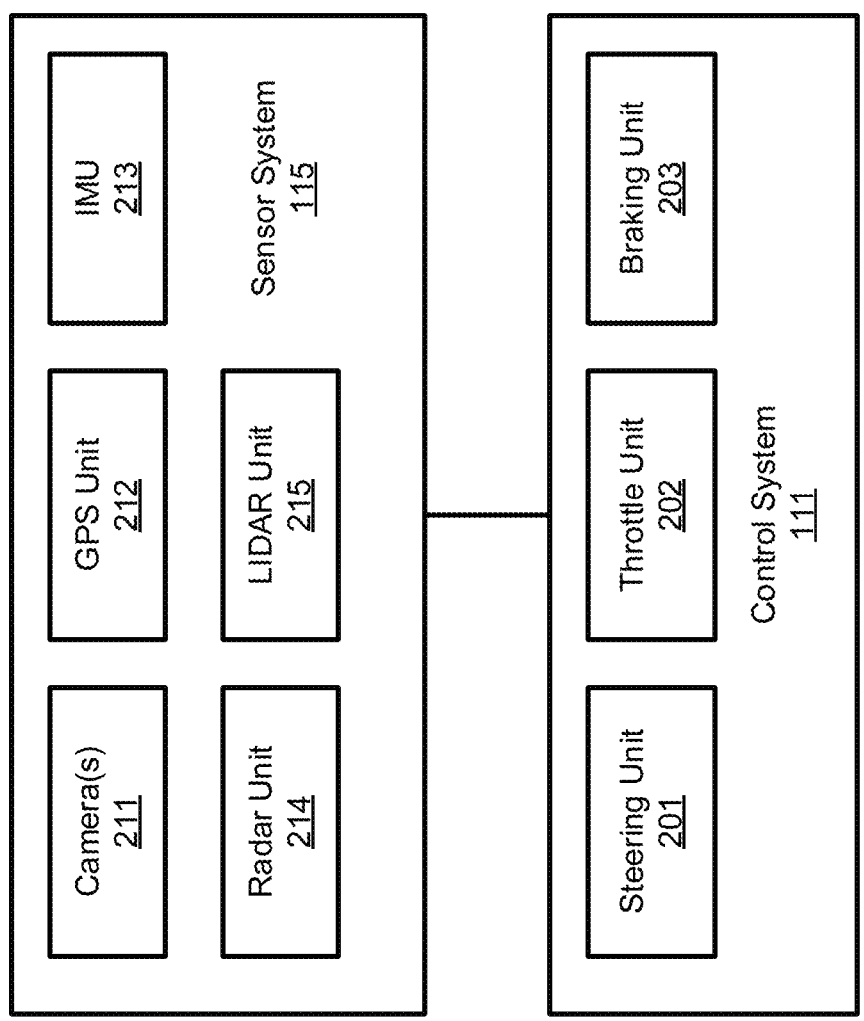
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point (starting location) to a destination point (destination location), and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include optimization models (e.g., DDP optimization model, etc.), which when executed provides an optimal path along which the ADV 101 may travel. For instance, an optimal path may be based on the minimization of an objective function that includes one or more costs (or cost functions) associated with navigating along the path. In other words, the optimal path is associated with the fewest costs in comparison to other candidate (or potential) paths in which the ADV may travel to reach a destination location. Algorithms 124 can then be uploaded on ADVs to be utilized during autonomous driving in real-time.

Figure 3A:
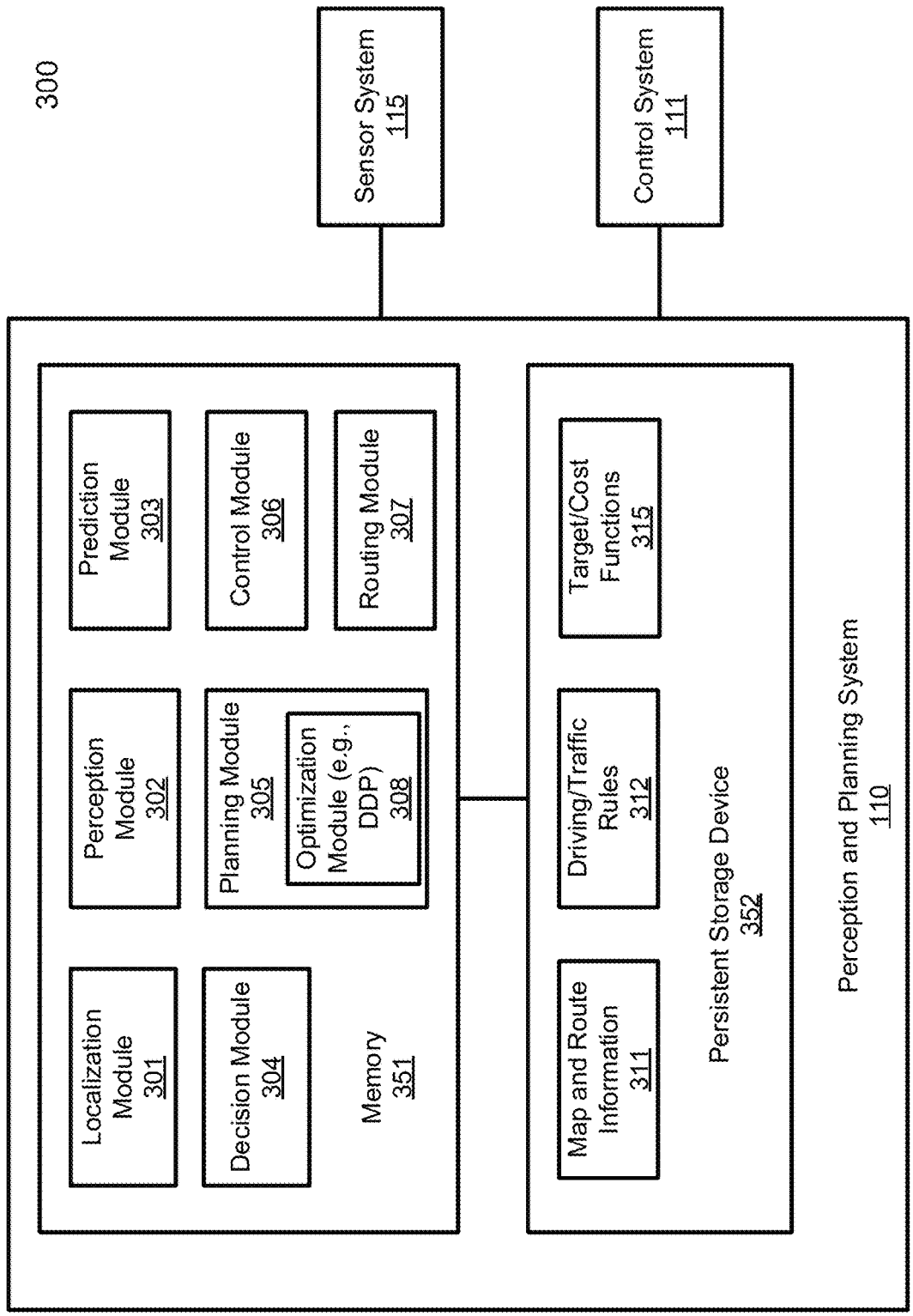
FIGS. 3A-3B are block diagrams illustrating an example of a perception and planning system used with an autonomous vehicle according to one embodiment.
Figure 3B:
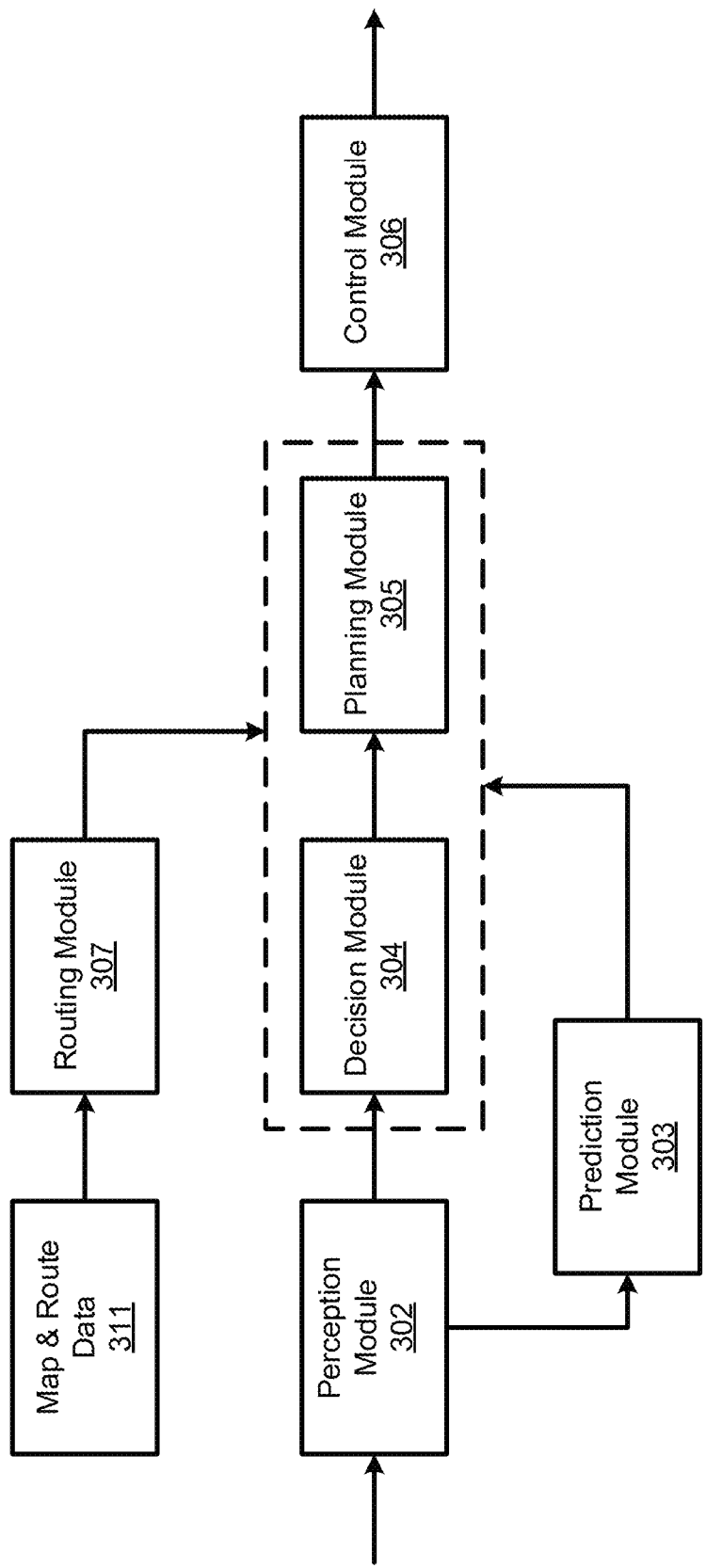

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route. In one embodiment, the control module 306 uses an optimal path trajectory (as described herein) to control (or maneuver) the ADV (e.g., issuing control commands) along the path trajectory. In another embodiment, the optimal path trajectory may be same (or different) as the reference line or route (path) determined by the routing module 307. For example, the path trajectory may be (slightly) different than the determined route, such that the trajectory may follow the route "generally", meaning the trajectory may make at least some of the same maneuvers and/or at least some different maneuvers, while reaching the destination location of the route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

As described above, route or routing module 307 manages any data related to a trip or route of a user. The user of the ADV specifies a starting and a destination location to obtain trip related data. Trip related data includes route segments and a reference line or reference points of the route segment. For example, based on route map info 311, route module 307 generates a route or road segments table and a reference points table. The reference points are in relations to road segments and/or lanes in the road segments table. The reference points can be interpolated to form one or more reference lines to control the ADV. The reference points can be specific to road segments and/or specific lanes of road segments.

In one embodiment, the routing module 307 may include a smoothing algorithm that generates a smooth reference line based on reference points representing a reference line, as describe herein. The smooth reference line can be converted into a relative coordinate system such as a station-lateral (SL) coordinate system before a decision module and/or a planning module such as decision module 304 and/and planning module 305 incorporates the smooth reference line with perceived obstacles and/or traffic information. In one embodiment, a station-lateral coordinate system is a coordinate system that references a fixed reference point to follow a reference line.

In one embodiment, decision module 304 generates a rough path profile based on a reference line (or the reference line having been smoothed by the routing module 307 as described above) and based on obstacles and/or traffic information perceived by the ADV, surrounding the ADV. The rough path profile can be a part of path/speed profiles which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line. In one embodiment, the generated rough path profile includes a station-lateral map, as part of SL maps/ST graphs which may be stored in persistent storage devices 352.

In one embodiment, decision module 304 generates a rough speed profile (as part of path/speed profiles stored within the persistent storage device 352) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle. In one embodiment, the rough speed profile includes a station-time (ST) graph (as part of SL maps/ST graphs 314). Station-time graph indicates a distance travelled with respect to time.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left (e.g., to come in direct contact with the obstacle), planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using at least one of several optimization models of the optimization module 308 within the planning module 305.

In one embodiment, the recalculated rough path profile includes a station-lateral map (as part of SL maps/ST graphs 314).

In one embodiment, planning module 305 may recalculate the rough speed profile using at least one of several optimization models of the optimization module 308 to optimize a speed cost function (as part of the cost functions 315). In some embodiments, similar speed barrier constraints can be added to forbid the optimization solver to search for some forbidden speeds. In one embodiment, the recalculated rough speed profile includes a station-time graph (as part of SL maps/ST graphs).

In some embodiments, the optimization module 308 may include one or more optimization solvers, where the optimization module 308 may also be implemented as a separate module. For instance, the module may include a quadratic programming (QP) solver to optimize one or more cost functions that are a part of the (e.g., path and/or speed) cost function. In another embodiment, the planning module may recalculate the rough path/speed profile using a Differential Dynamic Programming (DDP) solver to optimize one or more of the cost functions instead of (or in addition to) QP optimization. DDP is an iterative method that may numerically solve a non-linear optimal control problem, where at each iteration the solve performs a backward pass and a forward pass upon the cost functions. In one embodiment, DDP is an unconstraint optimization method, and therefore does not use state or control constraints. In another embodiment, however, the DDP solver may optimize an objective function in view of one or more constraints. More about using DDP is described herein.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 4 is a block diagram illustrating an example of a decision and planning system according to one embodiment. System 400 may be implemented as part of autonomous driving system 300 of FIGS. 3A-3B to perform path planning and speed planning operations. Referring to FIG. 4, decision and planning system 400 (also referred to as a planning and control or PnC system or module) includes, amongst others, routing module 307, localization/perception data 401, path decision module 403, speed decision module 405, path planning module 407, speed planning module 409, aggregator 411, and trajectory calculator 413. In one embodiment, the system may include one or more modules that are part of the autonomous driving system 300, such as the routing module 307 and the planning module 305.

Path decision module 403 and speed decision module 405 may be implemented as part of decision module 304. In one embodiment, path decision module 403 may include a path state machine, one or more path traffic rules, and a station-lateral maps generator. Path decision module 403 can generate a rough path profile as an initial constraint for the path/speed planning modules 407 and 409 using dynamic programming.

In one embodiment, the path state machine includes at least three states: a cruising state, a changing lane state, and/or an idle state. The path state machine provides previous planning results and important information such as whether the ADV is cruising or changing lanes. The path traffic rules, which may be part of driving/traffic rules 312 of FIG. 3A, include traffic rules that can affect the outcome of a path decisions module. For example, the path traffic rules can include traffic information such as construction traffic signs nearby the ADV can avoid lanes with such construction signs. From the states, traffic rules, reference line provided by routing module 307, and obstacles perceived by perception module 302 of the ADV, path decision module 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision module 405 or the speed decision module includes a speed state machine, speed traffic rules, and a station-time graphs generator (not shown). Speed decision process 405 or the speed decision module can generate a rough speed profile as an initial constraint for the path/speed planning modules 407 and 409 using dynamic programming. In one embodiment, the speed state machine includes at least two states: a speed-up state and/or a slow-down state. The speed traffic rules, which may be part of driving/traffic rules 312 of FIG. 3A, include traffic rules that can affect the outcome of a speed decisions module. For example, the speed traffic rules can include traffic information such as red/green traffic lights, another vehicle in a crossing route, etc. From a state of the speed state machine, speed traffic rules, rough path profile/SL map generated by decision module 403, and perceived obstacles, speed decision module 405 can generate a rough speed profile to control when to speed up and/or slow down the ADV. The SL graphs generator can generate a station-time (ST) graph as part of the rough speed profile.

In one embodiment, path planning module 407 includes one or more SL maps, a geometry smoother, and a path costs module (not shown). The SL maps can include the station-lateral maps generated by the SL maps generator of path decision module 403. Path planning module 407 can use a rough path profile (e.g., a station-lateral map) as the initial constraint to recalculate an optimal reference line using quadratic programming. Quadratic programming (QP) involves minimizing or maximizing an objective function (e.g., a quadratic function with several variables) subject to bounds, linear equality, and inequality constraints.

One difference between dynamic programming and quadratic programming is that quadratic programming optimizes all candidate movements for all points on the reference line at once. The geometry smoother can apply a smoothing algorithm (such as B-spline or regression) to the output station-lateral map. The path costs module can recalculate a reference line with a path cost function, to optimize a total cost for candidate movements for reference points, for example, using QP optimization performed by the optimization module 308. For example, in one embodiment, a total path cost function can be defined as follows:

$$\text{path cost} = \Sigma_{points}(\text{heading})^2 + \Sigma_{points}(\text{curvature})^2 + \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance represents the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, the path costs module can recalculate a reference line by minimizing the path cost using quadratic programming optimization, for example, by the optimization module 308.

Speed planning module 409 includes station-time graphs, a sequence smoother, and a speed costs module. The station-time graphs can include a ST graph generated by the ST graphs generator of speed decision module 405. Speed planning module 409 can use a rough speed profile (e.g., a station-time graph) and results from path planning module 407 as initial constraints to calculate an optimal station-time curve. The sequence smoother can apply a smoothing algorithm (such as B-spline or regression) to the time sequence of points. The speed costs module can recalculate the ST graph with a speed cost function to optimize a total cost for movement candidates (e.g., speed up/slow down) at different points in time.

For example, in one embodiment, a total speed cost function can be:

$$\text{speed cost} = \Sigma_{points}(\text{speed}')^2 + \Sigma_{points}(\text{speed}'')^2 + (\text{distance})^2,$$

where the speed costs are summed over all time progression points, speed' denotes an acceleration value or a cost to change speed between two adjacent points, speed'' denotes a jerk value, or a derivative of the acceleration value or a cost to change the acceleration between two adjacent points, and distance denotes a distance from the ST point to the destination location. Here, the speed costs module calculates a station-time graph by minimizing the speed cost using quadratic programming optimization, for example, by the optimization module.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on two consecutive points on an SL reference line or ST curve. In another embodiment, aggregator 411 can translate reference points from (S, L) coordinates to (x, y) coordinates. Trajectory generator 413 can calculate the final trajectory to control ADV 510. For example, based on the SLT graph provided by aggregator 411, trajectory generator 413 calculates a list of (x, y, T) points indicating at what time should the ADC pass a particular (x, y) coordinate.

Thus, path decision module 403 and speed decision module 405 are configured to generate a rough path profile and a rough speed profile taking into consideration obstacles and/or traffic conditions. Given all the path and speed decisions regarding the obstacles, path planning module 407 and speed planning module 409 are to optimize the rough path profile and the rough speed profile in view of the obstacles using QP programming to generate an optimal trajectory with minimum path cost and/or speed cost.

Figure 5A:
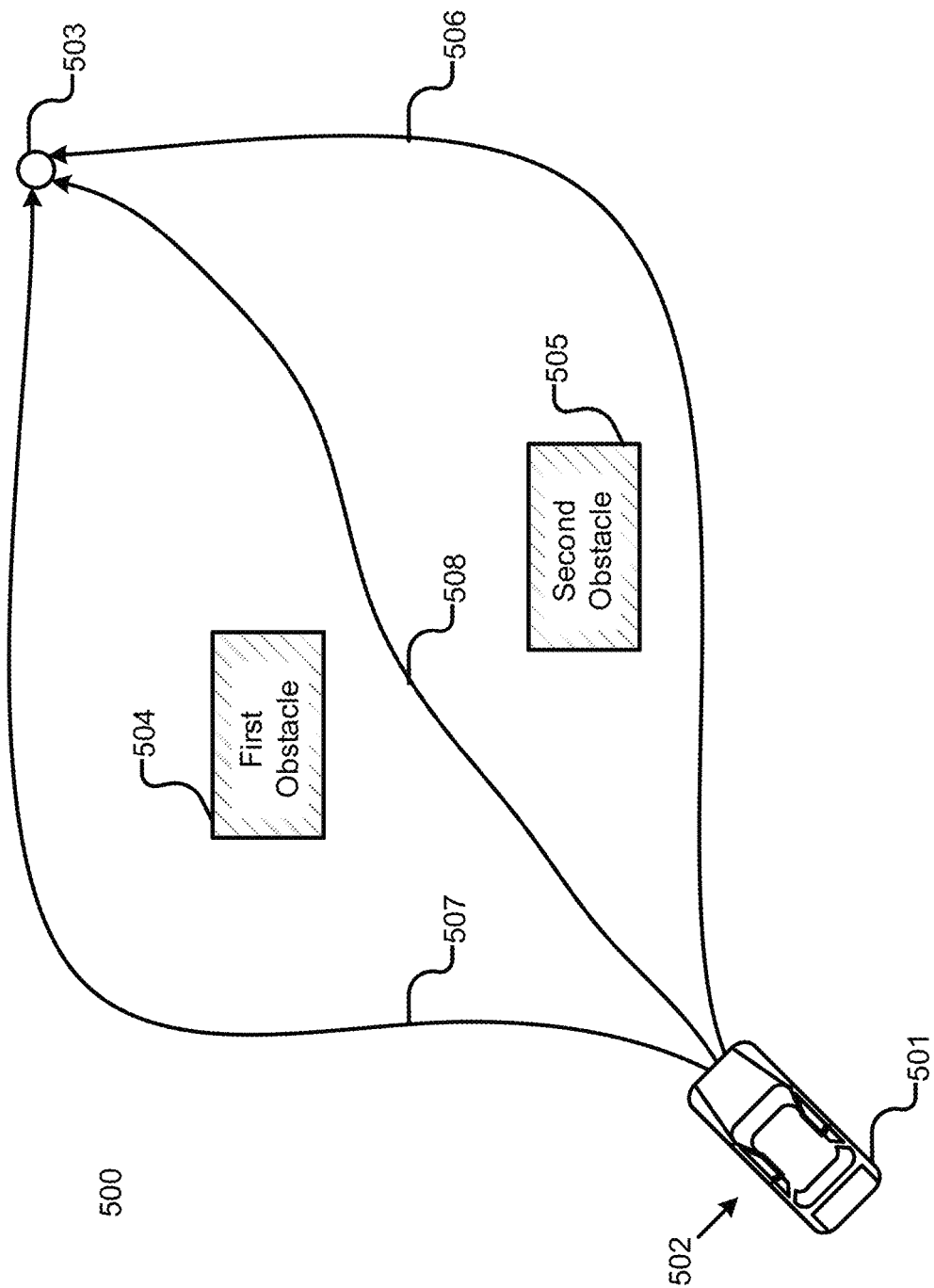
FIGS. 5A and 5B illustrate stages in which a less optimal path trajectory is produced according to one embodiment.
Figure 5B:
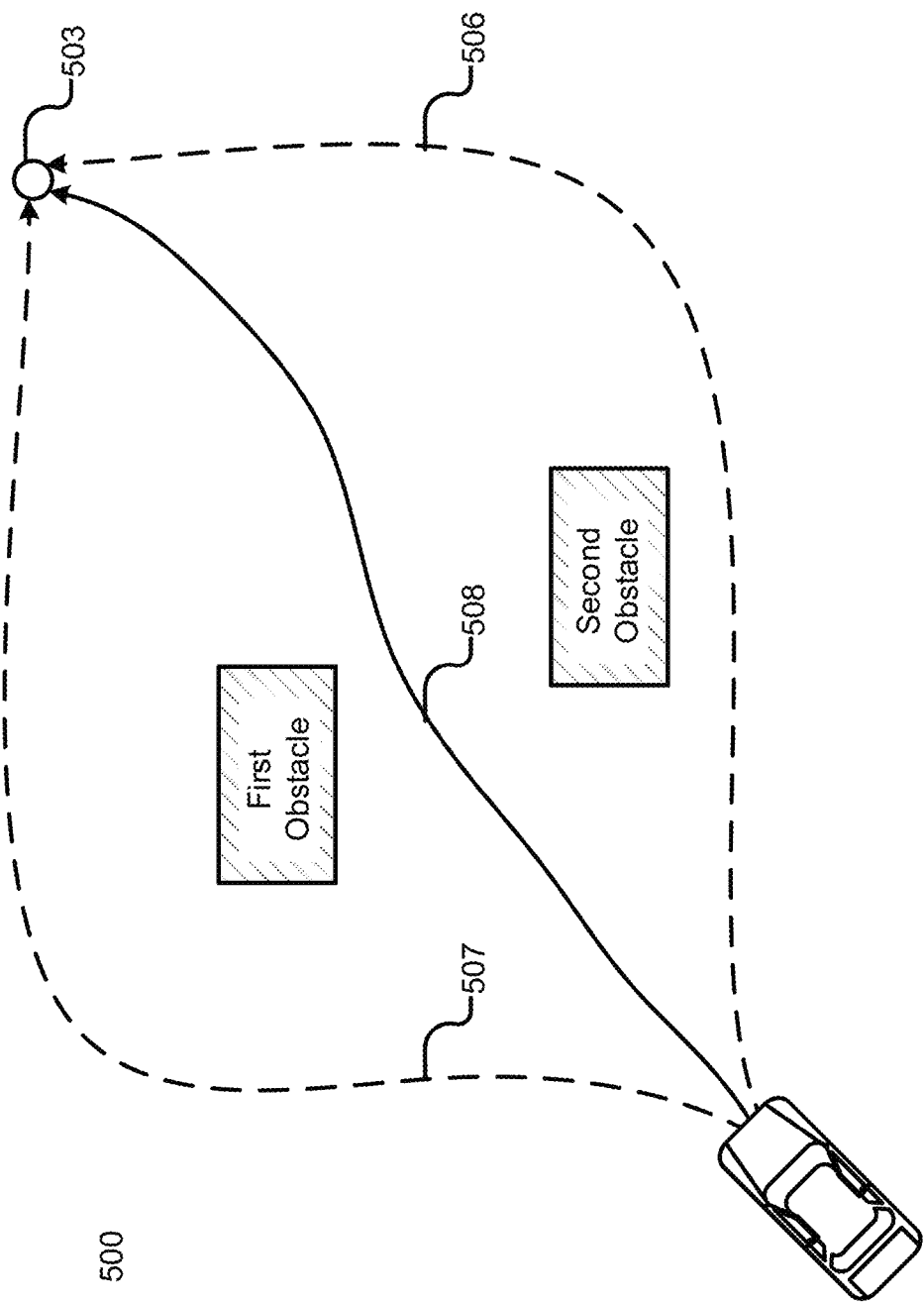

As described thus far, operations may be performed by the ADV in order to generate an optimal trajectory for a reference line (of a route) that is formed by the routing module 307 from a starting location to reach a desired location (e.g., a destination). When generating the trajectory, the system 400 (or more particularly the routing module 307) may first determine several (e.g., all possible) routes (or paths), and then select one of the routes for optimization. In one embodiment, the system may only optimize the selected route due to the required process time of the optimization solver (e.g., the QP solver). For instance, the generated cost functions associated with the selected route may have many costs (or dimensions). The optimization (minimization or maximization) of the costs may be related to the process time required to complete the operations. For instance, the more costs, the more process time may be required to complete the optimization operations. Although the trajectory along the route or path may be optimal, in some instances the selected route may be less optimal in relation to the other determined routes. As a result, the path trajectory may be less optimal in relation to a potential optimization of one or more of the other determined routes. FIGS. 5A-5B illustrate such a scenario.

FIGS. 5A and 5B illustrate stages in which a less optimal path trajectory is produced (or generated) according to one embodiment. Specifically, FIG. 5A shows a driving space 500 that includes an ADV 501, a first obstacle 504, and a second obstacle 505. In one embodiment, the ADV 501 may be similar to ADV 101 of FIG. 1. For instance, ADV 501 may include at least some of the same systems, such as the perception and planning system 110. In another embodiment, ADV 501 is the same as ADV 101. In some embodiment, the obstacles 504 may be any object in which the ADV 501 is to avoid contact (e.g., staying beyond a threshold distance, such as a foot) while navigating through the driving space 500. For instance, the obstacles may be other ADVs or vehicles within the driving space. In this case, the driving space 500 may be a parking lot or a roadway (e.g., with one or more lanes). As another example, at least one of the obstacles may be associated with driving/traffic rules (contained within rules 312), such as painted lines over which vehicles are not allowed to drive.

As shown, the ADV 501 is at a starting (first) location 502 within the driving space 500. In one embodiment, the starting location may a current location of the ADV (as determined by the localization module 301). As another example, the location 502 may be a starting point along which the ADV is to travel. For instance, as described herein, the location may be a specified location by a user. Also illustrated is a desired (second) location (e.g., a destination) 503 to which the ADV is to travel. Similarly, this location may be a destination of a trip that is specified by the user. In one embodiment, both locations may be different points along a route along which the ADV is already traveling. In another embodiment, the desired location 503 may be a point between a starting point (e.g., 502) and a final destination point.

With the starting location and desired location, the system determines three (candidate) routes along which the ADV 501 may travel to reach the desired location 503 from the starting location 502. The first route 506 traverses in front of and around the right side of both obstacles, the second route 507 traverses around the left side of and behind both obstacles, and the third route 508 traverses between both obstacles. As described herein, the routing module 307 may determine the routes and generate a reference line for each of the routes (e.g., where each reference line refers to an ideal route or path).

FIG. 5B illustrates the selection of one of the determined routes, from which an optimal path trajectory may be generated. Specifically, as described herein, the decision module 304 and/or planning module 305 may examine some or all of the determined routes 506-508 and select one of the routes for optimization. In one embodiment, the selection of the route may be based on one or more criteria. For example, the selection may be based on route characteristics, such as distance of travel (e.g., the length of a reference line of the route from the starting location 502 to the destination location 503), a number of turns or maneuvers that may need to be required by the ADV, etc. In particular, the route with the shortest length (or less maneuvers), with respect to the other routes, may be selected. As another example, the selection may be based on travel time along the routes (e.g., the route with the shortest travel time may be selected). As yet another example, the selection may be based on traffic conditions (as contained within rules 312) or predicted traffic conditions along the routes. For example, the prediction module 302 may predict that traffic is going to be heavy along the route 506 and 508 (e.g., based on historical data). Thus, the route that does not contain as much traffic may be selected. In addition, the selection may be based on the perceived environment (e.g., by the perception module 302). For example, some of the routes may be blocked (e.g., because of a stopped vehicle), while another route (e.g., route 507) is not obstructed.

In one embodiment, each of the determined routes may be assigned a score based on the one or more criteria. For instance, the score may be a numerical value (e.g., 0-100). In some embodiments, the system may select the route with the highest score, which indicates that the route is the most preferred or optimal with respect to the other scored routes.

As shown, the system selects the third route 508 (illustrated as remaining a solid line), from which an optimal path trajectory is generated. For instance, the selection may be based on the length of the routes, and the third route 508 is the shortest route from the three routes 506-508. In this case, however, an optimized path trajectory generated from the third route 508 may not be the most optimal trajectory. For example, an objective function having one or more costs for traveling along the second route 507 may be minimized more (or maximized more) than an objective function of the third route 508. This may be due to the fact that to travel along the third route 508, the ADV will have to make several and sudden movements to navigate around the two obstacles. As a result, a path trajectory generated from the optimized objective function of the second route 507 may be more optimal than a path trajectory generated from the optimized objective function of the third route 508 (and a path trajectory generated from the first route 506).

Figure 6:
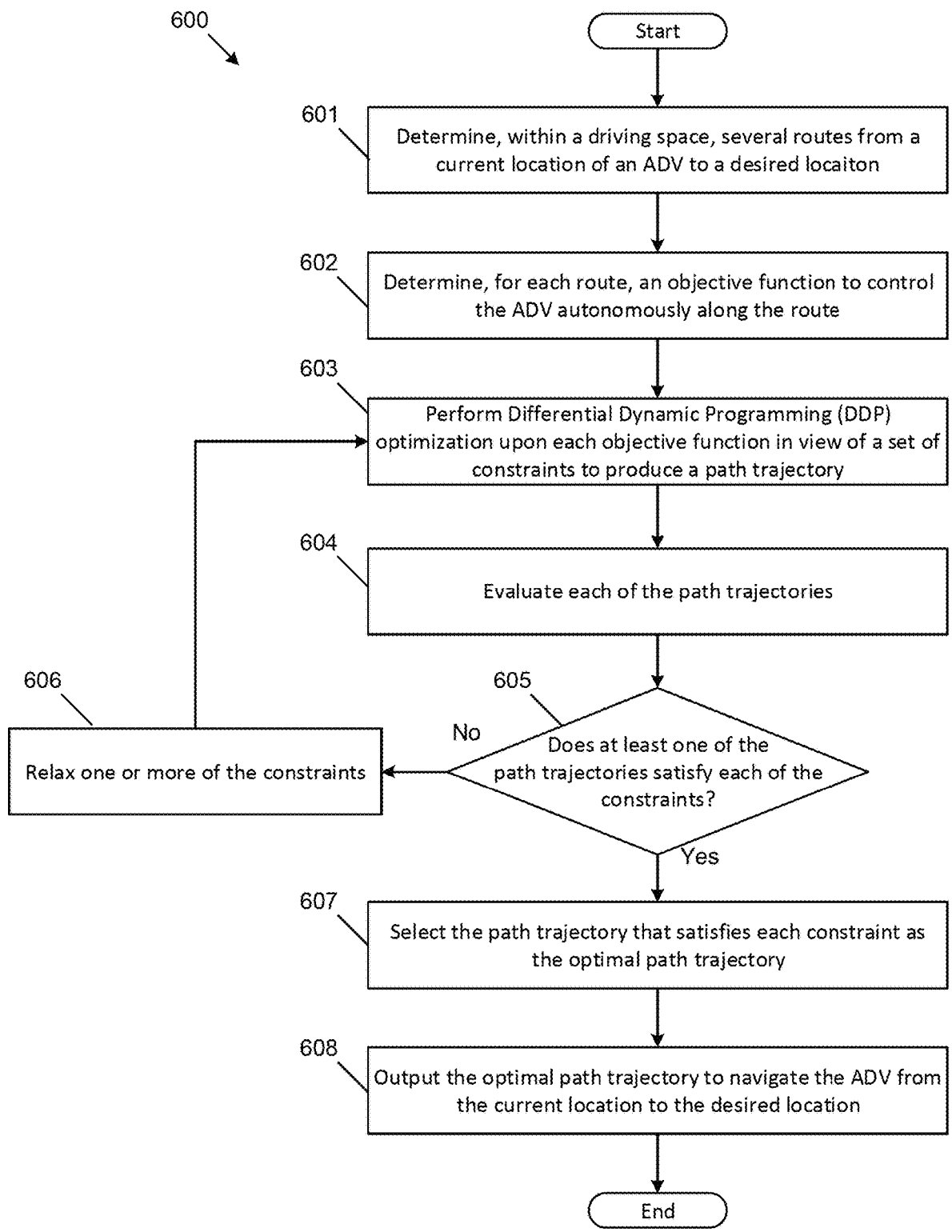
FIG. 6 is a flowchart of a process for performing Differential Dynamic Programming (DDP) optimization to produce an optimal path trajectory according to one embodiment.

FIG. 6 is a flowchart of a process for performing DDP optimization to produce an optimal path trajectory according to one embodiment. Specifically, the process produces an optimal path trajectory by optimizing several (e.g., all) of the routes along which an ADV is to travel. This process may be performed by one or more processors of the ADV (e.g., ADV 101). In particular, at least some of the operations may be performed by the perception and planning system 110 of for example FIG. 3A. In one embodiment, at least some of the operations may be performed by system 400 of FIG. 4.

The process 600 begins by determining, within a driving space, several routes from a current location of the ADV to a desired location (at block 601). As described herein, the routing module 307 may determine the routes and generate a reference line for each of the routes. The process 600 determines, for each route, an objective function to control the ADV autonomously along the route (at block 602). The objective function may include one or more costs (or cost functions) associated with navigating along the route. For instance, the decision module 304 may determine the costs, from the cost functions 315, associated with each route. As described herein, the costs may be based on a curvature of the route (or reference line), a distance from the reference line of the route and/or reference points to obstacles. In another embodiment, the costs may include one or more of: time efficiency (e.g., how long it will take to travel from the starting location to the desired location) along the route, driving comfort of the passengers (e.g., based on sudden movements due to increasing and decreasing acceleration or breaking required along the route), a number of maneuvers along the route, and a distance between the ADV and an obstacle (e.g., another vehicle on the road). In one embodiment, the objective function may be the same or similar to the cost functions described herein, such as the path cost function and/or speed cost function.

The process performs DDP optimization upon each objective function in view of a (first) set of constraints to produce a path trajectory for each route (at block 603), which may be performed substantial concurrently using DDP. Specifically, the (e.g., planning module 305 of the) planning system 110 performs DDP optimization upon the objective functions such that the objective functions reach a minimum (e.g., a predetermined threshold), in view of the constraints to produce (or generate) a corresponding path trajectory. In one embodiment, the path trajectory is an optimal trajectory for the route with minimum path cost and/or speed cost. In one embodiment, the system may perform DDP optimization upon each of the determined objective functions in parallel with one another. By performing the optimization in parallel, rather than serially, the process time may be reduced (e.g., to the time it takes to optimize one objective function).

In one embodiment, the constraints may include characteristics that are associated with the ADV, such as a velocity range of the ADV (e.g., how fast the ADV may travel), an acceleration range of the ADV (e.g., how quickly the ADV may accelerate and/or decelerate), a distance in front of the ADV (e.g., a distance between the ADV and an obstacle, such as another vehicle, that is in front of the ADV). In another embodiment, the constraints may relate to the driving space, such as a speed limit within the driving space, a distance between the ADV and road features (e.g., such as curbs), a threshold curvature of the road along which the route traverses, etc.

The process 600 evaluates each of the path trajectories (at block 604). In particular, the system 110 may determine whether any of the constraints have been violated for the optimized objective function of the path trajectory. For instance, at least one of the constraints may be a "hard" constraint, in which to optimize the objective function the constraint must be satisfied. Other constraints, however, may be "soft" constraints, which are allowed to be violated during the optimization process. In one embodiment, soft constraints may include at least some of the characteristics of the ADV, such as the velocity, acceleration, and distance, as described herein. In another embodiment, to evaluate the path trajectories, the system 110 may determine whether one or more costs of the optimized objective function exceeds a predetermined threshold.

In one embodiment, the system 110 evaluates each of the path trajectories by ranking the trajectories optimized objective function. For example, the system 110 may rank each of the functions based one or more costs of the function with respect to corresponding costs of the other functions. For example, the function with the least (summed) cost may be ranked higher (e.g., more desirable) than the other functions. In another embodiment, a higher ranked function may be based on one or more costs being higher (or lower) than corresponding costs of other functions. As an example, the function with the lowest cost to comfort may be ranked highest. In one embodiment, such a ranking may be true, even though the summed cost of that function is not the lowest with respect to the other functions.

The process 600 determines whether at least one of the path trajectories satisfies each of the constraints (at decision block 605). For instance, the system identifies whether the optimized objective function of any of the path trajectories is a feasible solution in which each of the (e.g., hard and soft) constraints are satisfied (e.g., are not violated). If not, the process 600 relaxes one or more of the constraints (at block 606). Specifically, the system automatically (e.g., without user intervention) relaxes one or more of the first set of constraints to produce a second set of constraints. For example, the system may increase (e.g., a range of) one or more of the constraints. For example, the first set of constraints may include a speed limit of 55 miles per hour (MPH) within the driving space. The system may relax the speed limit by increasing the speed limit to 65 MPH. In one embodiment, the system may increase the constraint by a predetermined threshold (e.g., by a numerical value or by a percentage). Returning to the previous example, the system may increase the speed limit by (approximately) 10% from 55 MPH to 60 MPH. As another example, to relax the constraints, the system may remove one or more of the constraints, such that the second set of constraints includes less constraints than the first set of constraints.

The process 600 returns to block 603 to perform DDP optimization upon each of the objective functions in view of the second set of constraints to produce at least one new path trajectory. The process 600 evaluates the new path trajectories and determines whether at least one of the trajectories satisfies the (new) second set of constraints. If not, the process 600 continues to perform the operations described in blocks 603-606, continuing to relax the constraints.

In response to, however, a path trajectory satisfying each of the constraints, the process 600 selects the path trajectory that satisfies each constraint as the optimal path trajectory (at block 607). In one embodiment, if more than one path trajectory satisfies each of the constraints, the system 110 may select the path trajectory with the highest ranked optimized objective function, as described herein. The process 600 outputs the optimal path trajectory to navigate the ADV from the current location to the desired location (at block 608).

Some embodiments perform variations of the process 600. For example, the specific operations of the process may not be performed in the exact order shown and described. The specific operations may not be performed in one continuous series of operations, some operations may be omitted, and different specific operations may be performed in different embodiments. In one variation, the process may be performed for a limited number of routes. For example, in order to minimize process time, the process may be performed for two to five routes, as determined at block 601. As a result, the system 110 would perform DDP optimization upon each of the objective functions associated with the routes in parallel.

Figure 7:
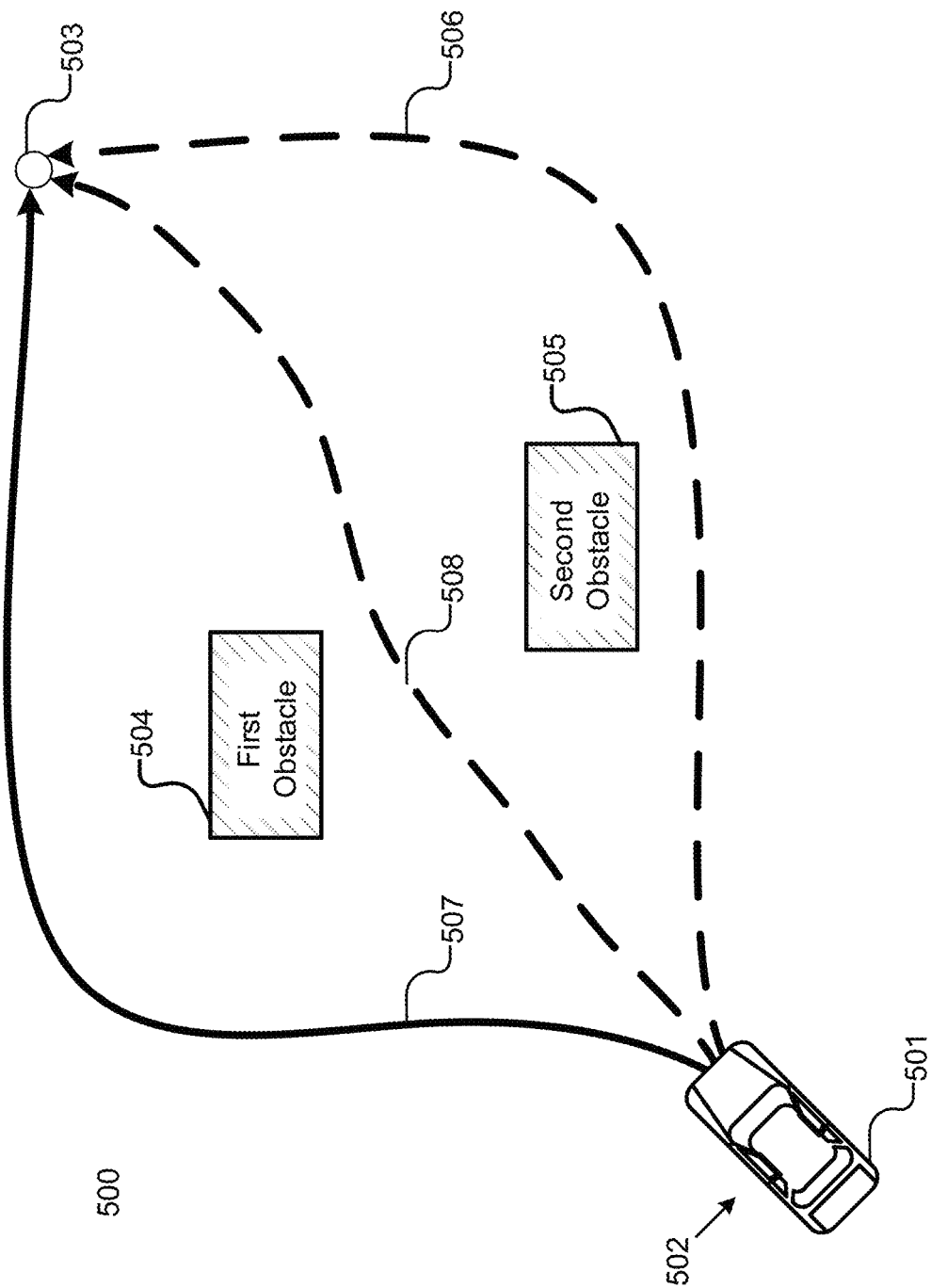
FIG. 7 shows an example in which an optimal path trajectory is selected according to one embodiment.

FIG. 7 shows an example in which an optimal path trajectory is selected according to one embodiment. Specifically, this figure shows the driving space 500 of FIGS. 5A and 5B. Unlike those figures, however, in which an optimal path trajectory is produced based on a selection of one of several routes, each of the routes 506-508 (objective functions) are optimized (in parallel) by the DDP solver to produce a path trajectory, as described in FIG. 6. This is illustrated by each of the routes being bold. Once produced, the system 110 selects a path trajectory associated with one of the routes based on whether all constraints are satisfied. In this case, the path trajectory of the second route 507 is selected.

Figure 8:
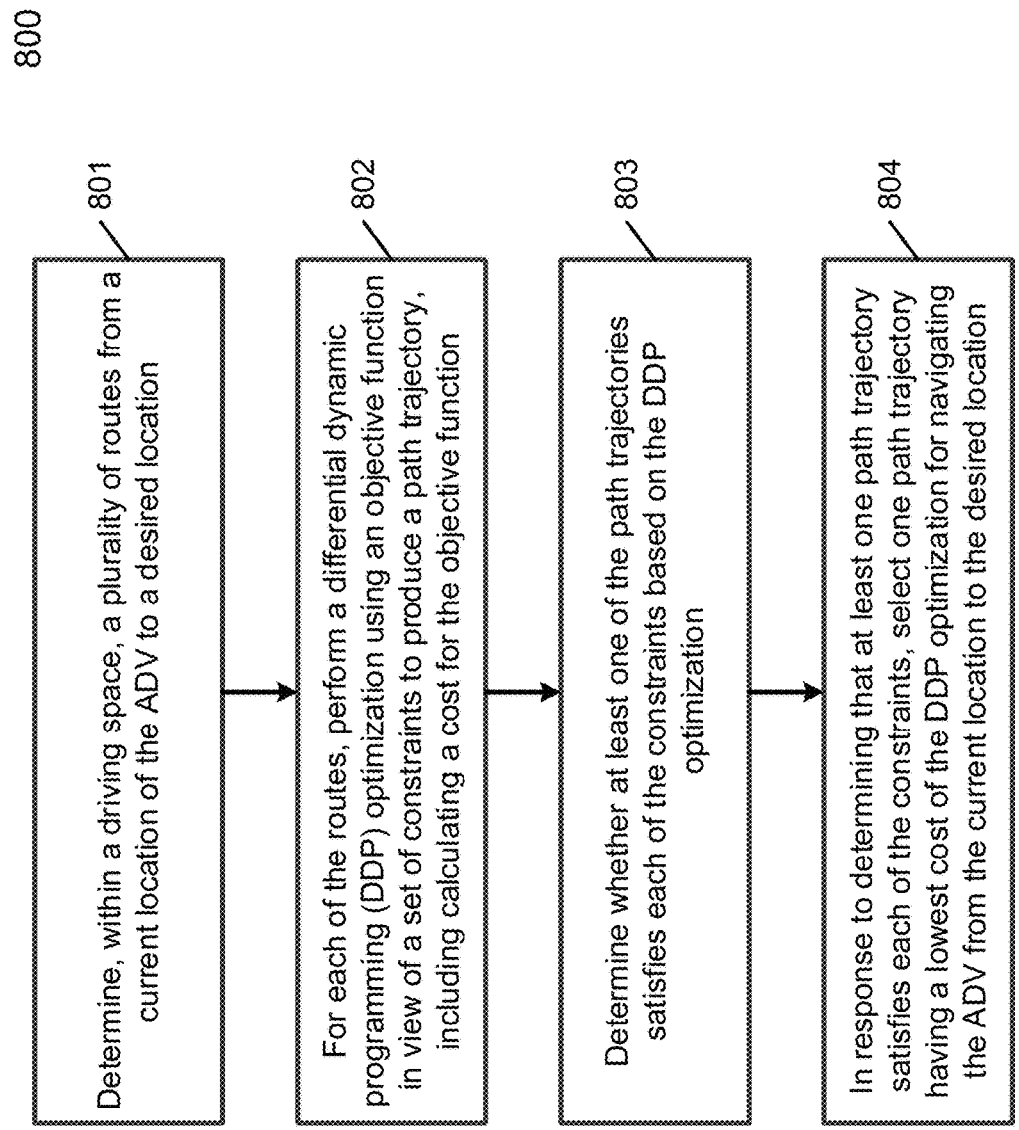
FIG. 8 is a flow diagram illustrating a process of operating an ADV according to one embodiment.

FIG. 8 is a flow diagram illustrating a process of operating an ADV according to one embodiment. Process 800 may be performed by processing logic which may include software, hardware, or a combination thereof. Referring to FIG. 8, at block 801, processing logic determines a number routes from a current location of the ADV to a desired location. At block 802, for each of the routes, processing logic performs a DDP optimization using an objective function in view of a set of constraints to produce a path trajectory, including calculating a cost for the objective function. At block 803, processing logic determines whether at least one of the path trajectories satisfies each of the constraints in the set based on the DDP optimization. In response to determining that at least one path trajectory satisfies the constraints, at block 804, one of the path trajectories having the lowest cost is selected for driving the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A computer-implemented method performed by an autonomous driving vehicle (ADV), the method comprising:
   determining, within a driving space, a plurality of routes from a current location of the ADV to a desired location;
   for each of the routes, performing a differential dynamic programming (DDP) optimization using an objective function in view of a first set of constraints to produce a path trajectory, including calculating a cost for the objective function;
   determining whether at least one of the path trajectories satisfies each of the constraints based on the DDP optimization;
   responsive to determining that at least one path trajectory satisfies each of the constraints, selecting one path trajectory having a lowest cost of the DDP optimization for navigating the ADV from the current location to the desired location; and
   responsive to determining that none of the path trajectories satisfy all of the first set of constraints
      automatically relaxing one or more constraints of the first set of constraints to produce a second set of constraints,
      for each of the objective functions, performing the DDP optimization in view of the second set of constraints to produce a new path trajectory, and
      selecting one of the new path trajectories that satisfies each constraint of the second set of constraints.

2. The method of claim 1, wherein the first and second sets of constraints comprises at least one of a velocity range of the ADV, an acceleration range of the ADV, a distance in front of the ADV, or a speed limit within the driving space.

3. The method of claim 1 further comprising, for each of the path trajectories, ranking the path trajectory's optimized objective function based on the cost for the function, wherein, responsive to determining that at least two path trajectories satisfy each constraint of the first set of constraints, the one path trajectory that is selected has a ranked optimized objective function that is higher than other ranked optimized objective functions.

4. The method of claim 1, wherein automatically relaxing the one or more constraints comprises at least one of increasing the one or more constraints by a predetermined threshold or removing one or more constraints, such that the second set of constraints includes the first set of constraints less than the removed one or more constraints.

5. The method of claim 1, wherein the DDP optimization is performed upon each of the objective functions in parallel with one another.

6. The method of claim 3, wherein each objective function includes a plurality of costs associated with navigating along its respective route, wherein ranking comprises assigning a highest rank to a path trajectory with an objective function which has a lowest subset of costs with respect to corresponding costs of other objective functions.

7. The method of claim 1, wherein determining whether at least one of the path trajectories satisfies each constraint comprises identifying a feasible solution associated with at least one of the optimized objective functions in view of all of the constraints.

8. A non-transitory machine-readable medium having instructions stored therein, which when executed by a processor, cause the processor to perform operations, the operations comprising:
   determining, within a driving space, a plurality of routes from a current location of an autonomous driving vehicle (ADVO to a desired location;
   for each of the routes, performing a differential dynamic programming (DDP) optimization using an objective function in view of a first set of constraints to produce a path trajectory, including calculating a cost for the objective function;
   determining whether at least one of the path trajectories satisfies each of the constraints based on the DDP optimization;
   responsive to determining that at least one path trajectory satisfies each of the constraints, selecting one path trajectory having a lowest cost of the DDP optimization for navigating the ADV from the current location to the desired location; and
   responsive to determining that none of the path trajectories satisfy all of the first set of constraints automatically relaxing one or more constraints of the first set of constraints to produce a second set of constraints,
      for each of the objective functions, performing the DDP optimization in view of the second set of constraints to produce a new path trajectory, and
      selecting one of the new path trajectories that satisfies each constraint of the second set of constraints.

9. The non-transitory machine-readable medium of claim 8, wherein the first and second sets of constraints comprises at least one of a velocity range of the ADV, an acceleration range of the ADV, a distance in front of the ADV, or a speed limit within the driving space.

10. The non-transitory machine-readable medium of claim 8, wherein the machine-readable medium comprises further instructions, which when executed by the processor, causes the processor to perform operations, comprising, for each of the path trajectories, ranking the path trajectory's optimized objective function based on the cost for the function, wherein in response to determining that at least two path trajectories satisfy each constraint of the set of constraints, the one path trajectory that is selected has a ranked optimized function that is higher than other ranked optimized objective functions.

11. The non-transitory machine-readable medium of claim 10, wherein automatically relaxing the one or more constraints comprises at least one of increasing the one or more constraints by a predetermined threshold or removing one or more constraints, such that the second set of constraints includes the first set of constraints less than the removed one or more constraints.

12. The non-transitory machine-readable medium of claim 8, wherein the DDP optimization is performed upon each of the objective functions in parallel with one another.

13. The non-transitory machine-readable medium of claim 10, wherein each objective function includes a plurality of costs associated with navigating along its respective route, wherein the ranking comprises assigning a highest rank to a path trajectory with an objective function which has a lowest subset of costs with respect to corresponding costs of other objective functions.

14. The non-transitory machine-readable medium of claim 8, wherein determining whether at least one of the path trajectories satisfies each constraint comprises identifying a feasible solution associated with at least one of the optimized objective functions in view of all of the constraints.

15. A data processing system, comprising:
a processor; and
a memory coupled to the processor to store instructions, which when executed by the processor, cause the processor to perform operations, the operations including
  determining, within a driving space, a plurality of routes from a current location of an autonomous driving vehicle (ADV) to a desired location,
  for each of the routes, performing a differential dynamic programming (DDP) optimization using an objective function in view of a first set of constraints to produce a path trajectory, including calculating a cost for the objective function,
  determining whether at least one of the path trajectories satisfies each of the constraints based on the DDP optimization,
  responsive to determining that at least one path trajectory satisfies each of the constraints, selecting one path trajectory having a lowest cost of the DDP optimization for navigating the ADV from the current location to the desired location,
  responsive to determining that none of the path trajectories satisfy all of the first set of constraints
    automatically relaxing one or more constraints of the first set of constraints to produce a second set of constraints,
    for each of the objective functions, performing the DDP optimization in view of the second set of constraints to produce a new path trajectory, and
    selecting one of the new path trajectories that satisfies each constraint of the second set of constraints.

16. The data processing system of claim 15, wherein the first and second sets of constraints comprises at least one of a velocity range of the ADV, an acceleration range of the ADV, a distance in front of the ADV, or a speed limit within the driving space.

17. The data processing system of claim 15, wherein the memory has further instructions, which when executed by causes the processor to operations, comprising, for each of the path trajectories, ranking the path trajectory's optimized objective function based on the cost of the function, wherein, in response to determining that at least two path trajectories satisfy each constraint of the set of constraints, the one path trajectory that is selected has a ranked optimized objective function that is higher than other ranked optimized objective functions.

18. The data processing system of claim 17, wherein automatically relaxing the one or more constraints comprises at least one of increasing the one or more constraints by a predetermined threshold or removing one or more constraints such that the second set of constraints includes the first set of constraints less than the removed one or more constraints.

19. The data processing system of claim 15, wherein the DDP optimization is performed upon each of the objective functions in parallel with one another.

20. The data processing system of claim 17, wherein each objective function includes a plurality of costs associated with navigating along its respective route, wherein the ranking comprises assigning a highest rank to a path trajectory with an objective function which has a lowest subset of costs with respect to corresponding costs of other objective functions.

21. The data processing system of claim 15, wherein determining whether at least one of the path trajectories satisfies each constraint comprises identifying a feasible solution associated with at least one of the optimized objective functions in view of all of the constraints.

* * * * *